Patented June 20, 1950

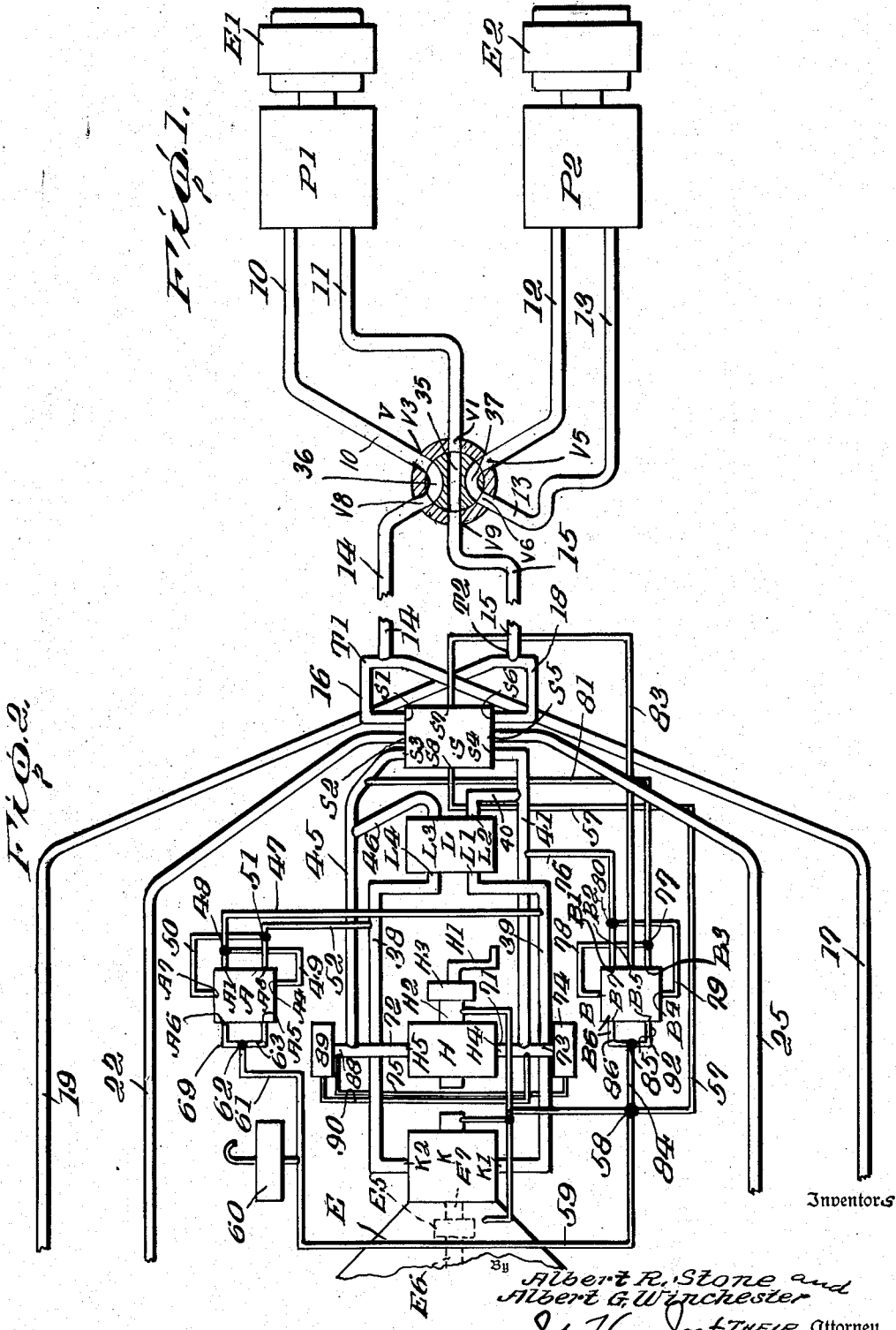

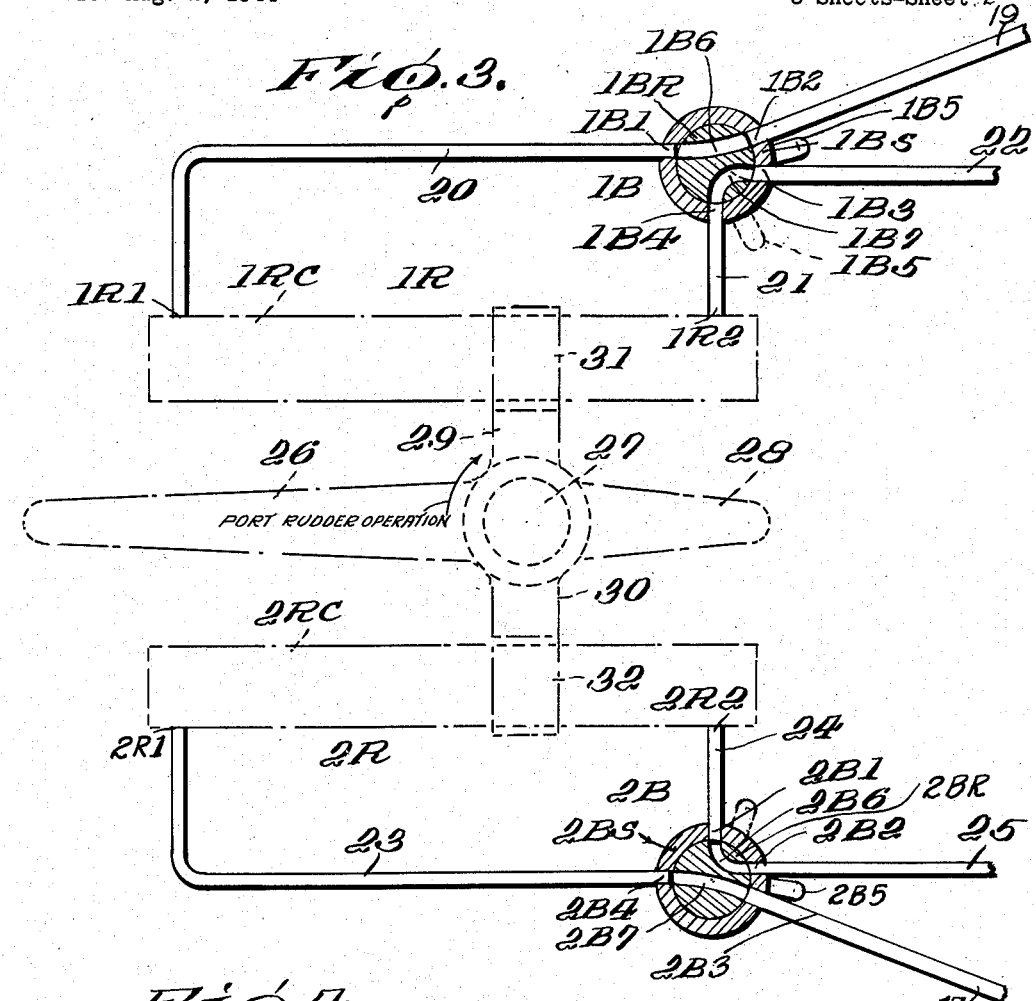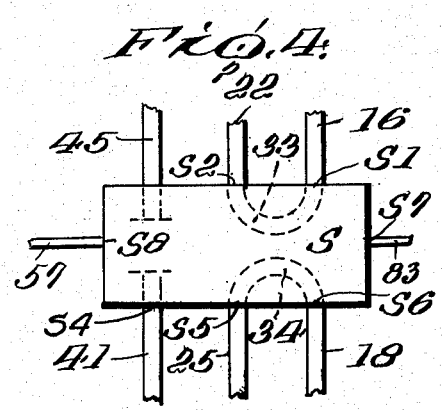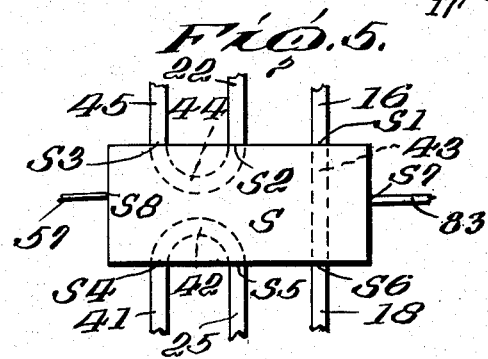

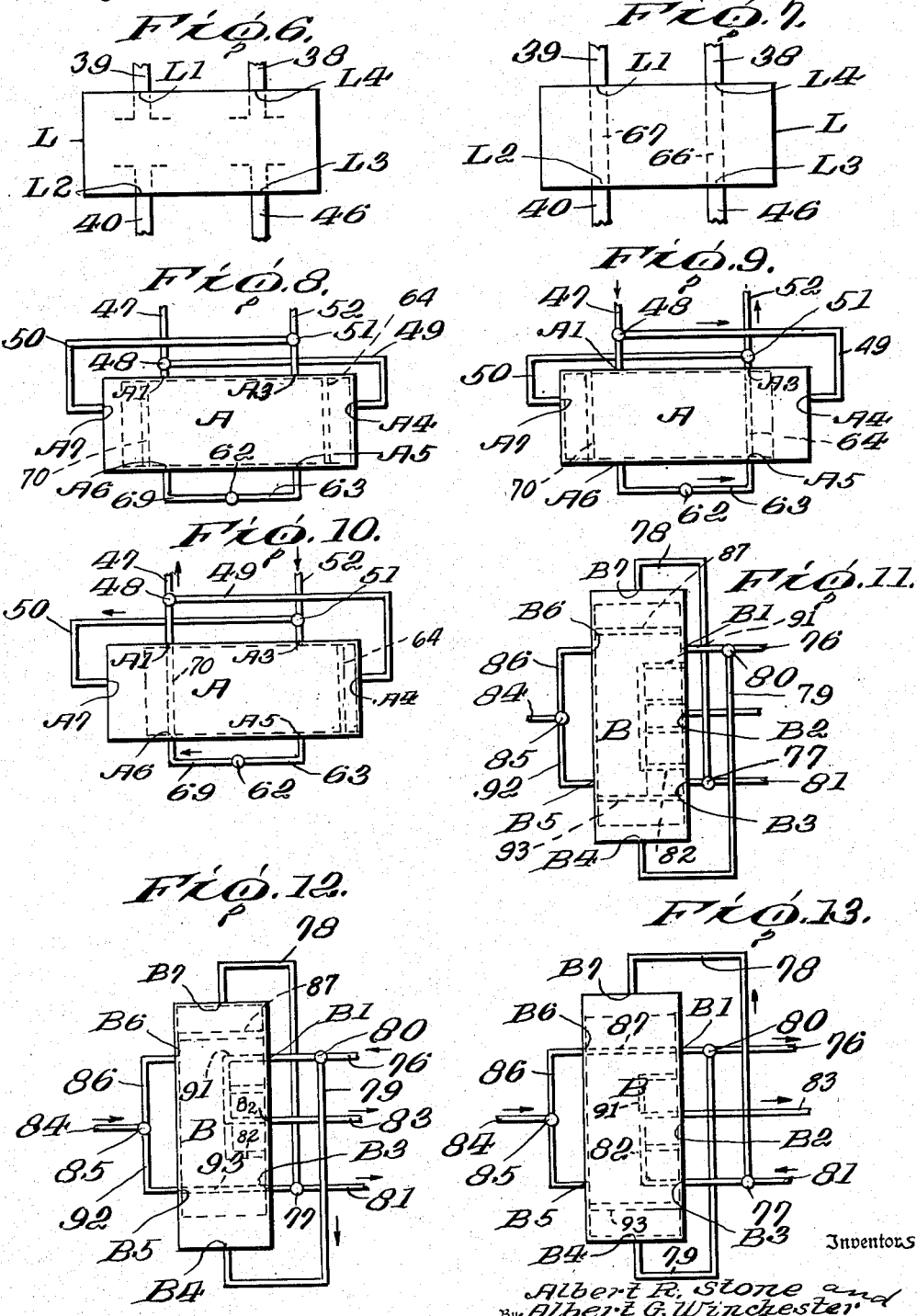

2,512,119

UNITED STATES PATENT OFFICE 2,512,119

AUXILIARY SHIP STEERING APPARATUS

Albert Rivington Stone, Anneslie, and Albert Girvin Winchester, Baltimore, Md., assignors to Gerotor May Corporation, a corporation of Maryland Application August 2, 1944, Serial No. 547,788

11 Claims. (Cl. 60—52)

Our invention relates to steering assemblies for rudder-directed vessels.

An object of our invention is to provide a steering assembly which tends towards ensuring navigability of the associated vessel at all times, even when the main controls have been destroyed, and which is of especial value in the instance of damage from wind, storm, collision, enemy action or other causes, and which is highly efficient, simple, compact and rugged.

Other objects in part will be obvious and in part pointed out hereinafter, in connection with the description of the apparatus disclosed in the accompanying drawings.

Our invention accordingly consists in the several elements, operational parts, and features of construction, and in the relation of each of the same to one or more of the others as described herein and set forth in the accompanying claims.

Referring now to the drawings:

Figures 1, 2, and 3 are related views, all schematic, of a preferred embodiment of our invention, in which Figure 1 constitutes the right-most part of the assembly, Figure 2 the intermediate part, and Figure 3 the left-most part;

Figures 4 and 5 disclose schematically one embodiment of the shift-over valve which we employ, Figure 4 illustrating the connections established for normal flow and Figure 5 depicting those for emergency operation;

Similarly, Figures 6 and 7 schematically disclose, respectively, the normal and emergency connections through a form of locking valve which we desire to use;

Figures 8, 9 and 10 show schematically the connections established by the motor-driven shuttle-valve for normal use and for port and starboard emergency steering respectively; while Figures 11, 12 and 13 are similar schematic views of the hand-driven shuttle valve, respectively, for normal use and for port and starboard emergency rudder.

As conducive to a more thorough understanding of our invention, it may be noted at this point that throughout the history of development of shipping, particularly for ocean travel, attention has been given to the problem of adequately providing for alternate methods and means of steering upon the occurrence of damage, for any reason, to the main steering equipment. Ocean-going vessels are frequently menaced from a variety of causes, such as wind, or electrical storms, high seas, tidal waves, icebergs, collisions or the like. Moreover, the hazards of open-sea travel have multiplied under war conditions. Shellfire, bombs, torpedoes, mines, or other enemy action may result in disabling important parts of the ship, including the steering controls. Particularly when precision attack is possible, enemy action frequently is first directed at the ship's bridge, where the principal controls are usually concentrated.

Heretofore it has frequently happened that when the bridge of the ordinary freight or cargo vessel, having only standard equipment, is taken out of action the entire ship is helpless and unmanageable.

It often happens that upon damage to vessels of modern present-day construction wherein a high degree of ruggedness and stability is imparted to the ship, the latter is able to remain afloat even though tremendous damage has been incurred. Under such conditions, provided only that some means of steering are available, it is quite possible that the vessel can be brought into port. The consequent tremendous saving in human lives, in cargo and in the vessel itself requires no discussion.

For these and many other reasons which are equally apparent, considerable attention has been given through the years to the provision of what may be called emergency steering control of vessels. Development work in this field has proceeded at accelerated pace since the outbreak of the present world war. It remains, however, that none of the developments heretofore brought forth have proved to be entirely satisfactory. For one reason or another, they have been found to be either unreliable, too complicated, cumbersome, expensive, or too slow in their control action. In short, no one has heretofore achieved a completely satisfactory solution of this problem.

A further important object of our invention, therefore, is to avoid and relieve, in large measure, the disadvantages and defects of the prior art, and at the same time to produce a ship steering assembly which will provide effective rudder control substantially at all times, so long as the vessel remains afloat. So long as the rudder remains substantially intact, and so long as the associated rudder-swinging means, such as steering motors or steering rams, remain without appreciable damage, it is important that auxiliary controls be available for manipulating the rudder and for thereby ensuring dirigibility of the ship.

A further important object of our invention, therefore, is to provide a ship-steering assembly which will function faithfully at substantially all times, short of major damage to the rudder or the rudder-swinging means themselves, or both.

For convenience of description, our invention may be divided into three parts, as follows: (1) Main steering control; (2) motor-driven auxiliary control; and (3) hand-driven auxiliary control. We will discuss these parts in the order just recited.

*Main hydraulic system*

Referring now to the practice of our invention and drawing attention to the drawings, pumps P1 and P2 (see Fig. 1) serve alternately to energize the main hydraulic system through main transfer valve V. They may be driven in any desired manner as by reciprocating engines, turbines, prime movers, or the like. In the present embodiment, however, we have elected to drive the pumps by means of suitable electrical motors E1 and E2, motor E1 and pump P1 being associated as a pair, while motor E2 and pump P2 are similarly paired. The pumps and the motor may be of any desired rating, and there is no compulsion that the elements of one pair have the same characteristics as the elements of the other pair. In the preferred embodiment, however, the pumps are of like rating. Similarly, the motors have like ratings and characteristics. This is for reasons of symmetry, among others. In operation only one set of paired pump and motor is employed at a time. When desired, as when necessary to dismantle, clean out and remove sludge from the operating pump, to lubricate or otherwise repair the same, this operable pump is de-energized and disconnected from the hydraulic system. At the same time, the other pump, which as a matter of good engineering practice has preferably been brought into rotation and is idling at or about full running speed, is cut into the main hydraulic system, to energize the latter.

For connection into the hydraulic system, each pump P1 and P2, is provided with paired conduits 10, 11 and 12, 13 respectively, leading to corresponding ports V3, V4, V5 and V6 in casing or stator V1 of main transfer valve V. These conduits of each pair serve interchangeably as either outlets or inlets, depending upon the direction of rotation of the corresponding pump.

The rotor V2 of main transfer valve V has two normal or working positions, disposed approximately 60 degrees apart. The valve rotor is so ported and chambered that in one such position it connects the conduits of the working pump P1 or P2 directly into the hydraulic system while simultaneously it closes the conduits of the decommissioned pump upon themselves, thus establishing a fluid short-circuit when that pump is started up and before it is cut into the system. Conversely, when the rotor V2 is swung through 60 degrees, the connections are reversed. The pump previously out of service is cut directly into the hydraulic system, while short-circuit fluid connections are established across the pump taken out of use.

From the valve V, main conduits 14 and 15 extend to T-connections T1 and T2, respectively (Figure 2). From one end of one such T-connection, T1, conduit 16 leads to port S1 of shift-over valve S, while from the other end thereof conduit 17 extends to port 2B3 of the second of two by-pass valves 1B and 2B (Figure 3), the purpose of which by-pass valves will be developed more fully hereinafter.

Similarly, from connection T2 conduit 18 leads to port S6 of valve S, while from the other end of this T-connection T2 conduit 19 extends to port 1B2 (Figure 3) of by-pass valve 1B.

Considering now the by-pass valve 1B of Figure 3, this valve comprises a valve stator or casing 1BS and an inner rotor 1BR. The rotor can be swung, by means of handle 1B5, back and forth from the full line or open position. Within rotor 1BR is provided an obtuse-angled conduit 1B6, which when the rotor 1BR is in its normal position, connects port 1B2 with port 1B1. By conduit 20, port 1B1 of by-pass valve 1B is connected with port 1R1 of cylinder 1RC of ram 1R. It is to be noted that this connection is adjacent one end of cylinder 1RC. This cylinder is also ported at 1R2 near its other end. By means of conduit 21, port 1R2 of cylinder 1RC is connected to port 1B4 of valve 1B. Conduit 1B7 in rotor 1BR, shown as acute-angled, normally interconnects ports 1B4 and 1B3 in the stator 1BS. Conduit 22 leads away from port 1B3. This conduit 22 leads (Figure 2) to port S2 of shift-over valve S.

In similar manner, by-pass valve 2B comprises a stator 2BS and an inner rotor 2BR. Conduit 2B7 leads from port 2B3 to port 2B4 in casing 2BS when the rotor 2BR is in its normal position. Conduit 23 extends between port 2B4 of valve 2B and port 2R1 at one end of cylinder 2RC of ram 2R. The other end of this ram cylinder is connected through port 2R2 to conduit 24, and thence to port 2B1 of valve 2B. Conduit 2B6 in valve rotor 2BR serves to connect, in normal position of the valve rotor, ports 2B1 and 2B2 of stator 2BS. Conduit 25 leads from port 2B2 to port S5 of shift-over valve S, Figure 2. Arm 2B5 serves to swing valve rotor 2BR from its normal position, shown in solid lines, into its inactive position, shown in dotted lines of the handle.

Referring again to the construction shown in Figure 3, rudder 26 swings on axis 27 between rams 1R and 2R, and is provided with a counterbalance portion 28. Arms 29, 30 extend from rudder 26, adjacent its axis of rotation 27, to ram 1R and 2R, respectively. These arms terminate respectively in pistons 31, 32, cooperating with corresponding ram cylinders 1RC and 2RC. These pistons are moved by hydraulic pressure within the cylinders, to swing rudder 26.

It is of value at this point to consider, in schematic manner, certain of the details of the shift-over valve as disclosed in Figure 4, which per se forms the subject of the companion copending application, Serial No. 547,789, of Albert G. Winchester, filed of even date herewith and entitled Shift-Over Valve. The Fig. 4 discloses, schematically, the connections established within the valve for normal operation of the cylinder. The precise manner of establishing these connections and the precise design of this valve do not comprise part of this invention and do not require detailed description at this point. Suffice it to say that the construction of the valve is such that in the normal operation of the steering system, from pump P1 or P2, connections are established between conduits 16 and 22 through ports S1 and S2 and conduit 33 within the valve. Similarly, connections are established from conduit 18 through port S6, conduit 34 within the valve and port S5, to conduit 25.

To understand thoroughly the operation of the hydraulic system from main control, we will briefly describe all modes of operation from main control. To this end we will first assume that motor E1 and pump P1 are started into operation, main transfer valve V being set accordingly; and that the direction of rotation of pump P1 is such as to provide for "left rudder."

In this case fluid passes through conduit 11 from what is now the outlet port of pump P1, through port V4, conduit 35 within the rotor V2, port V7 and thence through conduit 15 to T2.

From T2 the fluid divides into two branches and under pressure in the several branches energizes rams 1R and 2R. Thus it will be seen that the rams are operated in parallel for main rudder control. This operation is made possible because of the comparatively substantial rating of pump P1. It ensures rapid swinging of rudder 26, and hence sensitive control of the ship. For convenience, we will first describe the branch which controls ram 1R.

From connection T2 then, fluid courses up along conduit 19 to port 1B2 in stator 1BS. With the rotor setting as shown in solid lines at 1B5, the by-pass valve 1B is open to this supply fluid. The fluid passes across conduit 1B6, port 1B1, conduit 20 and port 1R1 to the left end of cylinder 1RC of ram 1R. This moves piston 31 to the right under fluid pressure, thereby swinging arm 29 clockwise, and pulling rudder 26 in the same direction, about its axis 27. Fluid at the right end of the cylinder is forced out through port 1R2, conduit 21, port 1B4, conduit 1B7, port 1B3 and conduit 22 to port S2 of valve S. Thence, as shown in Figure 4, the fluid passes through conduit 33, port S1 and conduit 16 to T1. From here fluid flow may be traced back to pump P1, through conduit 14, port V8, conduit 36 within rotor V2, port V3 and conduit 10 to the upper port, now serving as the inlet port of pump P1.

From T-connection T2 the flow of fluid for energizing ram 2R, may be traced through conduit 18, port S6, conduit 34 (Figure 4) port S5, conduit 25, port 2B2 (Figure 3), conduit 2B6, port 2B1 and conduit 24 to port 2R2 at the right end (Figure 3) of ram cylinder 2RC. The piston 32 is moved to the left in the figure under fluid pressure so that arm 30, and hence rudder 26, are swung clockwise about axis 27. Fluid is swept by the piston 32 out from the left side of the cylinder, through port 2R1, conduit 23, port 2B4, conduit 2B7, port 2B3, conduit 17, to connection T1 and thence back to pump P1 in the manner already described in connection with fluid returning from ram 1R. The rudder is thereby swept rapidly and positively into left rudder position under the coupled or combined effects of rams 1R and 2R.

Our description has progressed with the supposition that a single rudder is employed. Our invention is equally applicable, however, to the case where paired rudders are employed, the duplication of connections being apparent to those versed in the art. Similarly, while description has been herein made of the use of hydraulic rams for swinging the rudder, it is entirely feasible to employ electric or similar steering motors where desired, and we have found that these operate with entire satisfaction.

The foregoing description of operation has been for the left rudder conditions. When right rudder operation is desired, the direction of fluid flow is reversed. In this instance the fluid courses from the right in conduit 10 (Figure 1) across port V3, conduit 36, port V8, and conduit 14 to T-connection T1. From here the fluid in part courses through conduit 16, port S1, conduit 33 (Figure 4), port S2, conduit 22, port 1B3 (Figure 3), conduit 1B7, port 1B4, and conduit 21 to port 1R2 at the right of ram cylinder 1RC. As fluid pressure builds up, piston 31 is moved to the left in Figure 3, swinging arm 29 and rudder 26 in counter-clockwise direction about axis 27. Fluid at left of cylinder 1RC passes through port 1R1, conduit 20, port 1B1, conduit 1B6, port 1B2, and conduit 19 to T-connection T2. Thence, the fluid courses back through conduit 15, port V7, conduit 35, port V4, and conduit 11 to pump P1.

Simultaneously, fluid courses from T1 down through conduit 17, port 2B3 (Figure 3), conduit 2B7, port 2B4, conduit 23, and port 2R1 at the left end of ram cylinder 2RC (Figure 3). Piston 32 is moved by pressure fluid to the right, and arm 30 and rudder 26 are swung counter-clockwise about axis 27. Fluid from the right end of cylinder 2RC passes through port 2R2, conduit 24, port 2B1, conduit 2B6, port 2B2, conduit 25, port S5, conduit 34 (Figure 4), port S6, and conduit 18 back to T-connection T2. The fluid thence passes back to pump P1 in the manner already described with respect to fluid from ram 1R.

In the meantime, connections have been completed through valve V that should the pump P2 be idling on the line, impelled by motor E2, its fluid system is shorted on itself. Assuming a direction of rotation of pump P2 such that conduit 12 is the outlet conduit, fluid circuit can be traced from conduit 12, port V5, conduit 37, port V6, and conduit 13 back to pump P2. It will be noted that in this case no fluid connections are established between the idle pump P2 and the ram-operating circuit.

Should, however, the position of the rotor V2 of the main transfer valve V be turned clockwise 60 degrees from that position shown in Figure 1, it is the pump P1 which will be disconnected and idling. Short-circuit connections across this pump can be traced, for example, as follows: From conduit 11, port V4, conduit 36, port V3, and conduit 10 back to the pump.

What has been described has been with reference to pump P1. We will now describe the operation from pump P2. For left rudder operation from pump P2, circuit may be traced as follows: Conduit 13, port V6, conduit 37, port V5, conduit 15, to connection T2. Thence fluid in part follows conduit 19, port 1B2 (Figure 3), conduit 1B6, port 1B1, conduit 20 to port 1R1. Clockwise rotation of rudder 26 ensues, in manner previously described. Thence fluid courses through port 1R2, conduit 21, port 1B4, conduit 1B7, port 1B3, and conduit 22 to port S2 (Fig. 4), conduit 33, port S1, conduit 16, to connection T1. Thence through conduit 14, port V8, conduit 36, port V5 and conduit 12 back to pump P2.

At the same time, fluid courses from T2 through conduit 18, port S6, conduit 34 (Figure 4), port S5, conduit 25, port 2B2 (Figure 3), conduit 2B6, port 2B1, conduit 24 and port 2R2 to the right end (in Figure 3) of ram cylinder 2RC. Piston 32 is forced to the left, so that arm 30 and rudder 26 are swung clockwise in Figure 3, about axis 27. Return fluid flows from port 2R1 at left of cylinder 2RC, thence through conduit 23, port 2B4, conduit 2B7, port 2B3, and conduit 17, back to T-connection T1. There fluid recombines with fluid from ram 1R, and flows back to pump P2 in the manner heretofore described.

Upon reversal of direction of rotation of pump P2, for starboard rudder, circuit connections for the fluid can be traced briefly as follows: From conduit 12, port V5, conduit 35, port V8, conduit 14, to T1. Thence the fluid in part courses through conduit 16, port S1, conduit 33 (Figure 4), port S2, conduit 22, port 1B3 (Figure 3), conduit 1B7, port 1B4, conduit 21, to port 1R2 at the right end of ram cylinder 1RC. Piston 31 is forced to the left in Figure 3, swinging arm 29 and rudder 26 counter-clockwise about axis 27. Return circuit is established from left end of ram cylinder 1RC in Figure 3, through port 1R1, conduit 20, port 1B1, conduit 1B6, port 1B2, and conduit 19 to T2. Thence the fluid recombining with fluid from ram 2R, to be described, passes through conduit 15, port V9, conduit 37, port V6, and conduit 13 back to pump P2. At the same time, fluid circulates from T1 down through conduit 17, port 2B3 (Figure 3), conduit 2B7, port 2B4, conduit 23, and port 2R1 at the left end of ram cylinder 2RC. Piston 32 is forced to the right, swinging associated arm 30 and rudder 26 counterclockwise about axis 27. Return fluid circuit is established from port 2R2, conduit 24, port 2B1, conduit 2B6, port 2B2, conduit 25, port S5, conduit 34 (Figure 4), port S6, and conduit 18 back to T2, and thence returns to pump P2 over the route already traced.

From the foregoing it will be seen that the pumps P1, P2 serve alternately and independently of the other, to energize the fluid control system. Operation of main transfer valve V determines which pump is brought into service. While not in use, short-circuit connections are established for the de-commissioned pump by valve V, so that no damage will be caused by excess pressure through blocked conduits when the idle pump is brought into rotation. Rams 1R, 2R are operated in parallel, each pump being of sufficient capacity to permit such operation. The effects of the rams are additive, and each exerts considerable power or torque in swinging the rudder. Thus an extremely flexible and sensitive control is available, admirably adapted for modern-day, comparatively high speed operation.

Should for any reason it be desired, however, to decrease the sensitivity of rudder response in normal operation, we provide for this by the provision of the separate by-pass vales 1B, 2B, associated one with each ram, 1R, 2R. The normal operation of these by-pass valves has already been described. Their operation will now be described for working a single ram from a particular main pump P1 or P2.

Upon swinging, say, valve rotor 1BR from its normal position in Figure 3 as indicated by the full line position to its emergency position indicated by the dotted line position of said handle —a swing of about 90 degrees—the conduits 19, 22, and associated ports 1B2, 1B3, respectively, are disconnected from their straight-through association with rotor conduits 1B6, 1B7, respectively. Rather, these ports 1B2, 1B3 are thereupon blocked by the solid parts of the rotor 1BR. The fit between the rotor and the stator is such, and the materials from which these parts are constructed are so selected, that substantial leakage of the fluid in the hydraulic system will not occur when these ports are blocked. Ports 1B1 and 1B4 leading to the ram cylinder 1RC are connected through conduit 1B7. It will be seen, assuming that pump P1 is energizing the system for port rudder, that when the valve 1B is brought to the position just referred to, no fluid can flow from T2 through conduit 19 to this valve and return. The only positive control for the rudder then, is through ram 2R. Fluid closed off in the cylinder 1RC of ram 1R is forced from right end of the cylinder to the left end through conduit 21, port 1B4, conduit 1B7, port 1B1 and conduit 20 so as to exert a hydraulic buffing action on the rudder through piston 31 and arm 29 while the rudder is being ported by ram 2R.

Similarly, should for any reason it be desired to control the rudder 26 from the single ram 1R, the valve 1B is left in its normal position while valve 2B is shifted from its normal position, indicated by the solid line position of handle 2B5, into the position indicated by the dotted line position of this handle. The manner in which the valve rotor 2BR, (while in its secondary position), completes its circuit connections is just the same in principle as has heretofore been described with respect to valve 1B, and requires no repetition. Moreover, the operation of either valve for de-energization, either for starboard rudder on pump P1 or for either port or starboard rudder on pump P2, is clearly apparent and needs no further description. It is to be noted, however, that the manipulation of the bypass valves is permissible only during normal operation from the main pumps when the hydraulic systems of the two rams are connected in parallel. It will be disclosed hereinafter that when the auxiliary system is brought into service, the rams are no longer connected in parallel, but are in tandem. In such tandem operation, both by-pass valves must be open and in service.

The motor driven auxiliary system

The specific description given heretofore has been almost entirely in connection with the operation of the main hydraulic system. Sensitive operation is thereby provided for normal conditions. Ordinarily the controls for the rudder-swinging assembly are provided on the control bridge. Upon damage, however, to either the main pump assembly or the control bridge for any reason, as by enemy action or through action of the elements, there will be no means for steering the vessel unless suitable stand-by equipment is provided, the location of both which equipment and its control is at point or points remote from the bridge or main pumps.

Referring now more particularly to Figure 2, we disclose therein a motor-driven auxiliary pump K which is driven by and is shown as mounted co-axially with a suitable motor E, which may be a steam engine, an electric motor, or the like. The motor and pump preferably are encased in a water-tight housing (not shown) so as to be operable under water should the equipment become submersed due to emergency conditions. In the illustrative embodiment and for simplicity, the motor E is an electric motor. Let us assume, now, that damage has occurred to either the control bridge or the main pumps, or both, but that the ship is left afloat and can be brought into control if proper emergency steering facilities are available. In such instance the main transfer valve V is thrown into an intermediate position which blocks all conduits leading therethrough. Thus the fluid pumps P1 and P2 are closed off from the conduits 14, 15 by valve V and are rendered inactive. For maximum safety and ease of control the valve V preferably is disposed at a point remote from the control bridge and emergency steering motor and pump, and an electrical operating circuit for the motor E is provided with a control switch near the valve V.

Pump K is provided with paired conduits 38, 39.

leading from the ports K2, K1 thereof preferably through a self-locking valve L, to the shift-over valve S which latter valve may, for example, be of the piston type. When the control means of valve S is shifted into proper position (Figure 5), the conduits 38, 39, normally disconnected from the conduits 19, 22 and 17, 25 of the main hydraulic system, are connected thereto by the valves. A suitable system (not shown) such as an electrical relay system preferably is provided between the shift-over valve S and the main motors E1 and E2 so as to shut off the source of driving energy to the main motors when the control means of the valve is moved to emergency control position.

A pressure bleedline system moreover extends from the pump K and its associated conduits to the shift-over valve S so that when the pump K is brought into operation and develops pressure in its associated conduit system, pressure fluid in these bleed-lines serve to actuate the shift-over valve S, and to condition the valve for cutting in and maintaining the pump K on the main hydraulic system.

For simplicity the conduit system from pump K will first be described in its relation to valve S. Thereupon the manner in which the pressure bleedlines operate the valve S will be described, together with the mechanism for bringing about this operation.

Let us assume that port rudder operation is required. In such case, the motor E drives pump K in a direction such that port K1 of the pump becomes the outlet or high-pressure port. Fluid passes through conduit 39 to port L1 of the self-locking valve L. The operation of the valve L can best be understood by reference to the construction shown in Figures 6 and 7. Figure 6 discloses, schematically, the connections within the valve L for normal operation, when pump P1 or P2 is in service. Figure 7 discloses the connections which are established when main operation is discontinued and emergency operation maintains either from pump K, now being described, or pump H, later to be discussed. From port L1 (Fig. 7) fluid courses across conduit 67 to port L2 and thence through conduit 40. Thence the fluid courses down through conduit 41 to port S4 of valve S. The connections which are now established in valve S for this emergency position are disclosed in Figure 5. Fluid courses from port S4 through conduit 42 and port S5 to conduit 25. Thence, as seen in Figure 3, it courses across port 2B2, conduit 2B5, port 2B1, conduit 24, and port 2R2 to the right end of ram cylinder 2RC. Piston 32 is forced to the left in Figure 3, and the associated arm 30 and rudder 26 are swung clock-wise about axis 27, thereby giving rise to port-rudder operation. Fluid thence flows from the left end of ram cylinder 2RC through port 2R1, to conduit 23. Thence it courses across port 2B4, conduit 2B7, port 2B3, conduit 17, directly across T connection T1, (conduit 14 now being blocked by main transfer valve V). From conduit 16 the fluid courses across port S1 of shift-over valve S and thence (Figure 5) across conduit 43 to port S6, to conduit 18. Thence the fluid courses directly across T2 (conduit 15 now being blocked by valve V), conduit 19, port 1B2 (Fig. 3), conduit 1B6, port 1B1, conduit 20, port 1R1, to the left end of ram cylinder 1RC. Piston 31 is forced to the right in Figure 3, swinging arm 29 and rudder 26 in a clockwise direction about axis 27. The action is additive to that of the ram 2RC, and gives rise to port rudder operation. Fluid returns from the right end of the cylinder 1RC, through port 1R2, conduit 21, port 1B4, conduit 1B7, port 1B3, conduit 22, port S2 (Figure 5), conduit 44, port S3, conduit 45, conduit 46, port L3 of self-locking valve L (Fig. 7), conduit 66 within the valve L, to port L4 thereof and thence through conduit 38 back to the inlet side of pump K at port K2. It thus will be seen for the example given, fluid from the left of ram 2RC is passed into the left of ram cylinder 1RC and that this fluid is blocked against circulation through the pump K by the ram pistons 31 and 32 (Figure 3). The pump K nevertheless is in direct connection with ports 1R2 and 2R2 and the corresponding ends of the ram cylinders to the right of pistons 31 and 32. This port of the system accordingly contains fluid which in the present instance is actively displaced by the pump from the right-hand side of ram cylinder 2RC to the right-hand side of ram cylinder 1RC for operating the rudder 26 to port.

The rams 1R and 2R accordingly function in tandem, and exert a satisfactory control. The full force of stand-by pump K is applied to one ram cylinder rather than being distributed between two as in the case of the main power pump hence stand-by pump K is of rating substantially less than that of the main pumps P1 and P2. Even with reduced pump rating we find that our system achieves full ship speed control at about one-half rudder angle or half ship speed control at full rudder angle. This ordinarily is found adequate for auxiliary operation. As a further feature of our invention, it is noted that the two auxiliary controls are isolated one from the other. The fluid system of the pump K is maintained separate from that of a further piece of stand-by equipment, comprising hand-driven pump H, by means of the self-locking valve L. The purpose and construction of the pump H, will be described hereinafter.

The precise details of the construction of the valve L does not in itself comprise part of this invention, this being the subject of the Albert Rivington Stone Patent No. 2,387,307, issued October 23, 1945, and entitled Self-locking Hydraulic Linkage. It is sufficient to note that its construction is such that should momentary reverse loads of considerable magnitude be placed upon the hydraulic system, as by a large wave striking against the rudder, this momentary surge will be blocked out by the valve before reaching pump K. Although the use of the self-locking valve L in conjunction with the motor driven pump K is preferred, an anti-kickback device E5 such as a spring clutch, shock absorber, brake, or the like, may instead be connected to drive shaft E6 of the motor E and driven shaft E7 of the pump to relieve back surges on the motor which are initiated at the rudder. This protective device E5 may be of any satisfactory design, and does not per se form part of this invention. Further elaboration of its details is, therefore, unnecessary.

We find it preferable to bleed fluid to the main low pressure or fluid intake line between the self-locking valve L and motor driven pump K for substantially preventing the pumping of air to the self-locking valve. In the present embodiment we therefore provide auxiliary fluid supply means to compensate for any lack of fluid in the pump conduits 38, 39, which includes fluid expansion tank 60, shuttle valve A (see Figures 2, 8, 9 and 10), fluid lines interconnecting the tank and ports A5, A6, of the valve, and tap lines 52 and 47 leading from ports A3, A1 of the valve to conduits 38, 39 of pump K.

With pump K running to drive rudder 26 to port, conduit 39 becomes the pump discharge line while conduit 38 becomes the fluid intake line. A small quantity of pressure fluid from the pump pressure-leaks from conduit 39 through bleedline 47 to junction 48. From junction 48 a conduit 49 leads the fluid to port A4 of valve A and into the valve casing. Within the casing the fluid drives shuttle means of the valve to a position which establishes the circuit connections shown in Figure 9. Any fluid displaced from the shuttle valve A in the shuttling operation is returned via port A7 and conduit 50 to junction 51, then through bleedline 52 to conduit 38, and thence back to the inlet or low pressure side K2 of pump K. Once the valve shuttle means undergoes displacement to the position represented in Figure 9 fluid flow across or between valve ports A1, A6 is blocked, while conduit 64 establishes communication between ports A3, A5 of the valve.

The expansion tank 60 is connected by means of conduits 61 and 63 with the valve port A5. A flow of auxiliary fluid may be traced from the tank through the conduits just mentioned, through the conduit 64 in valve A to port A3. From port A3 the fluid courses through bleedline 52 and then discharges into the main inlet conduit of pump K to provide any needed additional supply of fluid between the self-locking valve and the pump, while the pump is in operation.

An auxiliary supply of fluid likewise is provided in conduit 39 when the pump K is reversed for starboard rudder. In this case, conduit 38 becomes the high pressure conduit leading from the pump and, therefore, fluid pressure leaks from this conduit into bleedline 52. A tap line 50 conducts the fluid from line 52 to port A7 in the valve casing so as to cause fluid pressure displacement of the valve shuttle means to the valving position shown in Figure 10. Any fluid displaced from the shuttle valve A in the shuttling operation, as from neutral or balanced fluid pressure position of the shuttling means represented in Figure 8 is returned to the pump K from port A4 via conduits 49 and 47 which connect the port just mentioned with intake conduit 39. With the valve set to position represented in Figure 10, it will be noted that fluid flow across valve ports A3, A5 now is blocked, while conduit 70 interconnects ports A1, A6 within the valve casing. There is accordingly made available, when the emergency pump circuit so demands, a flow of fluid from expansion tank 60. Fluid from the expansion tank reaches port A6, through conduits 61 and 69 which connect the tank with the port, and continues along conduit 70, through port A1, and bleedline 47 to discharge into pressure conduit 39 of the pump K.

The shift-over valve S, as has been mentioned is set, upon energization of pump K, from its normal position shown in Figure 4, to its emerency position depicted in Figure 5, wherein it connects pump K across the main hydraulic system. The preferred mode of accomplishing this valve movement is through the intermediary of the fluid-pressure actuated shuttle valve B (Figures 2, 11, 12, 13), pressure fluid bleedlines leading from the pump K to the shuttle valve and shift-over valve, and a pressure responsive control piston or the like in the shift-over valve.

For a discussion of this operation it will be assumed that port rudder conditions maintain. On the far side of self-locking valve L from pump K, a bleedline 76 (Figure 2) leads to port B1 of the shuttle valve B. From junction 80, a conduit 79 leads to port B4. The fluid, which pressure-leaks through conduit 79 from conduit 41, drives the shuttle means of valve B to a position which establishes the circuit connections shown in Figure 12. Any fluid displaced from the shuttle valve B in the operation is returned through port B7 and conduit 78 to junction 77 and thence through bleedline 81 to conduit 45, and thence back to the inlet or low-pressure side of pump K. Through conduit 91, in valve B, the fluid from conduit 76 passes through port B2 and conduit 83. Thence the fluid continues through port S7 of the shift-over valve S. Ordinarily when the pump K is deenergized, the pressure on opposite sides of the movable element of the shift-over valve S, as applied through ports S7, S8, is the same. The valve is then in its initial position and the normal fluid circuits as discussed with respect to Fig. 4 of the drawing are then established. The normal fluid circuits, as have been heretofore discussed with respect to Figure 4 of the drawings, are then established. Should, however, pressures build up at the inlet port S7 to a value in excess of that exerted at port S8, the movable element of the valve is shifted bodily to the left in Figure 5 to establish the fluid circuits shown in that figure. Fluid compressed at the left side of the valve S (Figure 5) is forced out of port S8, through the conduit 57 to junction 58 and thence through conduit 59 to expansion tank 60. Part of the fluid at junction 58 courses through conduit 84 to junction 85, conduit 92, port B5, conduit 93 within the valve B, port B3 and conduit 81, back to the return or low pressure conduit 45 of pump K. The movable element of shift-over valve S is thus effectively moved by the pressure differential into its emergency position shown in Figure 5.

It is apparent that upon de-energization of pump K and movement of the transfer valve V back to one of its two initial positions for operation by pumps P1, P2, the movable element of the valve S may be moved in suitable manner to its initial position shown in Fig. 4 as by equalization of fluid pressure or by external mechanical means as shown in the companion application referred to above. To replenish the fluid which has been pressure-forced into the expansion tank 60 upon movement of valve S to the left, fluid will, upon return of valve S to its normal position, flow from the expansion tank through conduit 59, junction 58 and conduit 57 to port S8.

It is now desirable to discuss the emergency operation through pump K, for starboard rudder. In this instance, port K2 of pump K becomes the outlet, or high-pressure port. Fluid courses under pressure through conduit 38 to port L4 of the self-locking valve L, the purpose of which has been detailed hereinbefore. The fluid then courses across conduit 66 within the valve L as shown in Figure 7. From port L3 the fluid courses conduit 46, conduit 45, to port S3 of valve S. Thence through conduit 44, port S2, conduit 22, port 1B3, conduit 1B7, port 1B4, conduit 21, and port 1R2, to the right side (Figure 3) of the ram cylinder 1RC. The piston 31 is thereby forced to the left in Figure 3, and arm 29 and rudder 26 are swept counter-clockwise (Figure 3) about axis 27, for starboard rudder. Fluid in the left portion of ram cylinder 1RC is swept through port 1R1, conduit 20, port 1B1, conduit 1B6, port 1B2, conduit 19, T-connection T2, conduit 18, port S6, conduit 43, port S1, conduit 16, T-connection T1, and conduit 17 to port 2B3. Thence the fluid courses through conduit 2B7, port 2B4, conduit 23, and port 2R1, to the left side (Figure 3) of ram cylinder 2RC. Here again the chambers to the left of the ram pistons 31 and 32 are isolated from direct connection with the auxiliary pump. From the right end of the ram cylinder 2RC it will be seen that fluid courses through port 2R2, conduit 24, port 2B1, conduit 2B6, port 2B2, conduit 25, port S5, conduit 42, port S4, conduit 41, conduit 40, port L2 of valve L (Fig. 7) conduit 67, Figure 7, port L1, and conduit 39, back to the low-pressure port K1 of pump K.

The bleedline connections for starboard rudder may be traced as follows: From high-pressure line 45, through conduit 81 to junction 77, thence through conduit 78 to port B7, driving the valve shuttle to the valve setting shown in Figure 13. Fluid displaced from the valve by virtue of the shuttle setting courses through port B4, conduit 79, junction 80, and conduit 76, back to the low-pressure main conduit 41, and thence through lock-out valve L to low-pressure port K1 of the pump. With this valve setting, a connection is established from conduit 81 through port B3, conduit 82 within valve B (Figure 13), port B2 and conduit 83 to port S7 of shift-over valve S. The movable element of the valve S is thereupon moved bodily to the left, establishing the fluid circuit connections shown in Figure 5. The fluid displaced on the left side of the valve element by the movement of the latter is forced out through port S8, thence through conduit 57 to junction 58, and through conduit 59 to expansion tank 60. Part of the fluid at junction 58 flows through conduits 84 and 86 to port B6, then through conduit 87 (Fig. 13) within the valve, port B1, and through conduit 76 back to main conduit 41 and thence to the low-pressure port K1 of the pump.

It is to be noted that while the direction of movement of the motor-driven shuttle valve A for starboard rudder is almost exactly the reverse of its movement for port-rudder, nevertheless, the control action which it exerts on the shift-over valve S is the same for both directions of rudder movement by emergency control. In each instance the movement of the shift-over valve S is in the same direction.

The motor-driven auxiliary pump K and its associated system is admirably suited for controlling the steering apparatus of a ship in which the main steering system has undergone substantial damage of some sort. At reduced speeds and assuming that the vessel is otherwise seaworthy, and that the rudder itself is substantially undamaged, this auxiliary pump will provide effective rudder control and will ensure reasonable and adequate dirigibility of the ship. The vessel may be suitably operated through this auxiliary rudder control up to approximately half-speed of the vessel, and the rudder can be swept through approximately 35 degrees in either direction from dead center.

It is quite possible, however, that through unfortunate coincidence, part of the central steam plant, the central electrical plant, or other principal sources of energy for the motor E undergoes substantial damage. In this instance, unless further provision is made and additional stand-by equipment is available, it will be impossible to steer the vessel and it will be left to the mercy of the elements or to subsequent leisurely enemy action. We provide against this contingency by the provision of a second unit of stand-by equipment comprising a hand-driven auxiliary pump.

Hand-driven auxiliary apparatus

This hand-driven auxiliary pump H is shown, schematically, in Figure 2 as disposed at the right of the pump K. Preferably the pump H is disposed closely adjacent the rams 1R, 2R and the rudder 26. A crank H1, illustratively disposed at a safe point aboard the ship remote from the pump is secured in desired suitable manner as through shafting and gearing to the shaft H2 of the pump H. The pump H also preferably is housed in a water-tight casing (not shown) so as to be operable under water. When desired, the hand-driven pump H and motor driven pump K with driving motor E may be provided in a unitary submersible casing (not shown). A suitable safety device, known as an anti-kickback device, is disposed in the shaft H2, between the pump H and the operating crank H1. This anti-kickback device H3 may be any one of a number of conventional designs. It serves to protect the operator from sudden reverse surges of fluid occasioned by large waves striking the rudder and the like, and effectively protects the operator from injury from this cause. In this respect it is somewhat similar to the self-locking valve L which has already been described.

Conduit 71 extends from port H4 of pump H to conduit 41 which passes to port S4 of shift-over valve S. From port H5 of pump H a conduit 72 extends to conduit 45 and is thereby connected with port S3 of valve S.

This hand-operated pump is of course designed only for extreme emergency conditions and is operated entirely by hand. The torque which can be developed is of course relatively small, and the rudder action is correspondingly slow and sluggish. It is, however, ordinarily adequate for extreme slow speed operation, and, for example, proves to be satisfactory up to about one-fourth speed. We will first describe its operation for port rudder, and then for starboard rudder. Assuming that the crank H1 is rotated in the proper direction for left rudder, the fluid courses through the outlet port H4, conduit 71, conduit 41, port S4, conduit 42, port S5, conduit 25, port 2B2, conduit 2B6, port 2B1, conduit 24, and port 2R2, to the right side (Figure 3) of ram cylinder 2RC. Piston 32 is forced to the left (Figure 3), thereby sweeping arm 30 and rudder 26 clockwise (Figure 3) about axis 27, thus giving rise to port rudder operation. From the left end of the ram cylinder 2RC, the fluid passes through port 2R1, conduit 23, port 2B4, conduit 2B7, port 2B3, conduit 17, T-connection T1, and conduit 16 to port S1 of shift-over valve S. Thence, in series connection, the fluid courses through conduit 43, port S6, conduit 18, T-connection T2, conduit 19, port 1B2, conduit 1B6, port 1B1, conduit 20, and port 1R1 at the left (Figure 3) end of ram 1R. Fluid from the right end of cylinder 1RC courses through port 1R2, conduit 21, port 1B4, conduit 1B7, port 1B3, conduit 22, port S2, conduit 44, port S3, and conduit 45, back to conduit 72 and port H5 to pump H.

At the same time, should for any reason excess pressure be developed in outlet conduit 71, this excess fluid passes through conduit 73 to relief valve 74 and thence through pressure bleedline 75 to the low-pressure line 72 and back to the pump. Fluid at excess pressure is thus relieved through the blow-off valve 74.

At the same time and having reference in particular to Figures 2 and 12, pressure bleedlines are employed to ensure proper movement of shift-over valve S through shuttle valve B. Figure 12 discloses, schematically, the connections within the shuttle valve B which are established for port rudder operation. Through bleedline 76 from conduit 41, pressure fluid is transmitted to junction 80, thence through bleedline 79. Part of the fluid courses to port B4, and thence into the valve, moving the shuttle and thus conditioning the valve to the position shown in Figure 12. Fluid displaced at the opposite end of the shuttle courses through conduit 78 to junction 77 and back through bleedline 81 to the return conduits 45 and 72, to the low-pressure port H5 of pump H.

Part of the fluid in conduit 76 passes across junction 80 to port B1. Thence (Figure 12), it courses through conduit 91 within valve B to port B2, and thence through conduit 83 to port S7. The movable element of the valve S is moved to the left, establishing the fluid circuits shown in Figure 5. The fluid displaced at the opposite end of the valve passes through port S8, conduit 57, junction 58, conduit 84, junction 85, conduit 92, port B5, conduit 93 within valve B, port B3, and bleedline 81, back to conduit 45, conduit 72, and low-pressure or inlet port H5 of the pump H.

For starboard rudder operation through pump H, fluid connections are substantially the reverse of those just described and may be traced as follows: From high pressure or outlet port H5, conduit 72, conduit 45, port S3, conduit 44, port S2, conduit 22, port 1B3, conduit 1B7, port 1B4, conduit 21, and port 1R2 at the right end (Figure 3) of the ram cylinder 1RC. Piston 31 is forced to the left (Figure 3). Arm 29 and rudder 26 are forced counter-clockwise (Figure 3) about axis 27. This gives rise to starboard rudder conditions. From the left end of cylinder 1RC the fluid courses through port 1R1, conduit 20, port 1B1, conduit 1B6, port 1B2, conduit 19, T-connection T2, conduit 18, port S6, conduit 43, port S1 and conduit 16 to T-connection T1. Thence in series connection the fluid courses through conduit 17 to port 2B3, conduit 2B7, port 2B4, conduit 23, and port 2R1 to the left end (Figure 3) of ram cylinder 2RC. From the right end of cylinder 2RC, the fluid courses through port 2R2, conduit 24, port 2B1, conduit 2B6, port 2B2, conduit 25, port S5, conduit 42, port S4, conduit 41 and thence back through conduit 71 to the port H4, which is now the low-pressure or inlet port. Starboard rudder action is accomplished simply by reversing the direction of rotation of crank H1.

Should for any reason excess pressure be developed through the rotation of the pump H, this is relieved through the passage of fluid through conduits 72 and 88 to pressure relief valve 89. Excess fluid blown off under pressure conditions from this relief valve passes back through pressure bleedline 90 to conduit 71 and thence to the low-pressure inlet port H4.

While these pressure relief valves have been described primarily with respect to and in association with hand-driven stand-by pump H, it is at once apparent that it is equally feasible to equip pump K with such auxiliaries, and we contemplate such use.

During starboard rudder control from pump H, the shuttle valve B is energized so that the shuttle means thereof is moved to the valving position shown diagrammatically in Figure 13 which is just the reverse of the position existing during the port rudder operation. The pressure bleedline circuit may be traced as follows, having reference to Figures 2 and 13: From high-pressure conduit 45, pressure bleedline 81 conducts the fluid to junction 77 and thence through conduit 78 to port B7 of the shuttle valve B. The fluid passes across to port B7, driving the shuttle, and fluid at opposite end of the shuttle is displaced and courses bleedline 79 to junction 80 and thence back through bleedline 76 to low-pressure inlet port H4 of the pump H. From junction 77 the high-pressure fluid also passes to port B3 and thence (Figure 13) through conduit 82 within the valve B to port B2, whence the fluid passes through bleedline 83, to port S7 of the shift-over valve S. The differential of the pressure thus created forces the movable element of the valve S to the left in Figure 5, establishing the fluid circuits shown in that figure. Fluid forced outwardly at the left side of the movable element passes through port S8, bleedline 57, junction 58, bleedlines 84 and 86, port B6, conduit 87 in valve B, port B1 and thence through bleedline 76 to the low-pressure conduit 41. Thence the fluid returns to the low-pressure or inlet port H4 of the pump H.

It will be noted that while the direction of movement of the shuttle valve B is substantially reversed for port and starboard rudder conditions, in each instance the effect on the shift-over valve S is the same, and the direction of movement of the latter under the influence of the hand-driven stand-by pump is the same for both directions of rudder operation.

The operation of the various parts of the apparatus is apparent from the foregoing detailed description, so that no repetition is required at this point. The important advantages obtain that so long as the vessel remains afloat and sufficient rudder exists intact to guide it, the steering assembly exists for steering the vessel regardless of the extent of damage thereto. Thus, for high speed normal operation the main rudder controls are available, energized by main pumps P1, P2 of high rating. Sensitive, rapid control is ensured.

Upon damage, however, to the main assembly, the motor-driven stand-by pump K, both the pump itself and the controls of which are disposed remote from the main pump and its controls, respectively, is brought into operation. The rams are then series-connected and are energized so as to swing the rudder at moderate intermediate speed. Less sensitive rudder control is ensured, sufficient, however, to steer the ship satisfactorily at reduced speed up to about half-speed. Should major damage be occasioned to both the main pump assembly and the motor-driven stand-by equipment, there remains the hand-driven pump H which permits operation of the rams, in tandem, at reduced pressure and so as to swing the rudder with sufficient rapidity to navigate the vessel at low speeds, up to, say, about one-fourth speed.

While the various valves and fluid circuit connections (conduits and bleedlines) are shown in schematic development and in extended form for clarity of illustration and description, it will of course be understood that these elements of the apparatus are unitary and self-contained, and are of small compass. Thus, the assembly is relatively compact and requires but small space within the ship.

It will be obvious from the foregoing that while both pieces of stand-by equipment are adapted for ready association and introduction into the same hydraulic system, and while it is also obvious that this is the same hydraulic system which is adapted to be energized by one or the other of the main pumps P1, P2, nevertheless, the construction is so advantageously designed that no interference will be occasioned by that one of the pumps which is energized, with the pumps which are de-commissioned, and are held as stand-by equipment.

A further important feature of our invention, is the provison for the pumps K and H of means to prevent momentary reverse surges of fluid which momentarily are at pressure in excess of those exerted by the pumps in the working direction of the fluid. Because these pumps have lower ratings than the pumps P1, P2, they sometimes are unable to overcome sudden reverse stresses such as are produced usually by large waves striking the rudder and tending to swing it in a direction opposite to that caused by the pump. No such provision is ordinarily necessary for pumps P1, P2, since the torques produced by these pumps are sufficient usually to overcome sudden reverse stresses produced in the fluid system.

We claim:

1. A ship-steering assembly comprising, in combination; a rudder swingably mounted on the ship; coupled hydraulic means connected with said rudder for swinging the latter; a shift-over valve having selective main and emergency control position; a main hydraulic pump connected through the shift-over valve with said coupled hydraulic means in parallel arrangement, said connection being established with the shift-over valve in main control position; and an emergency hydraulic pump having a relatively small capacity as compared with said main pump, connected with said coupled hydraulic means in tandem arrangement through said shift-over valve in emergency control position.

2. A ship steering apparatus having a hydraulic rudder steering control system comprising in combination, main and auxiliary pumps, a plurality of hydraulic piston-cylinder steering motors, a shift-over valve through which the main pump is connected with said steering motors in parallel arrangement and cut out with connection of said auxiliary pump to said motors in tandem arrangement and pressure bleedline means connected with said auxiliary pump and the shift-over valve for effecting auxiliary control position of the valve when the auxiliary pump is started.

3. In a ship-steering apparatus comprising a steering rudder, a pair of hydraulic means connected to said rudder for swinging the latter, a hydraulic system for operating said rudder-swinging means, a main pump normally connected in said hydraulic system with said pair of hydraulic means in parallel arrangement, and a shift-over valve for selectively cutting said pump into and out of connection with said fluid system; the combination of an auxiliary pump connected with said shift-over valve and normally blocked out of said hydraulic system, pressure lines from said auxiliary pump to said shift-over valve for pressure-controlling the latter to cut the auxiliary pump, when energized, into said hydraulic system and connecting said pair of hydraulic means in series, and a relief valve connected in the hydraulic system adjacent the auxiliary pump, for releasing excess pressure from said auxiliary pump and shift-over valve.

4. In a ship-steering assembly for rudder controlled ships, a plurality of hydraulic rams for driving the rudder, auxiliary pump means for operating said plurality of rams in series relationship with one another in either direction of pumping, and pressure-actuated self-locking valve means open for passage of fluid in the direction of flow established by the pump means and effective in blocking momentary reversed direction surges of fluid on said pump.

5. A ship-steering assembly comprising, in combination, a rudder, a pair of hydraulic means connected with said rudder for driving the same, main and emergency pumps in corresponding hydraulic systems and adapted to be connected with said rudder driving means, hydraulically operable shift-over valve means common to the systems of said pumps for selectively connecing said pair of rudder driving means in parallel and to one of the pumps to the substantial exclusion of the other, and a bleeder system from said emergency system, for hydraulically actuating said shift-over valve to connect said pair of rudder driving means in series and to said emergency pump.

6. A ship-steering assembly comprising, in combination, a plurality of rudder driving motors and a pump for supplying fluid to the same in a main hydraulic system, motor-driven and hand-driven auxiliary pumps each in series auxiliary system with said rudder driving motors, and a shift-over valve common to the main and auxiliary systems for selectively rendering either one of the systems operative to the exclusion of the other, and connecting the motors in parallel arrangement for the one and in series arrangement for the other.

7. A ship-steering assembly comprising, in combination, a hydraulic rudder motor, a main pump in hydraulic system with said rudder motor for operating the same, motor-driven and hand-driven pumps in auxiliary systems with said rudder motor, a shift-over valve for selectively rendering the auxiliary systems operative to the exclusion of the main system, and a self-locking valve disposed hydraulically between said motor-driven auxiliary pumps and the shift-over valve for arresting reversed pressure.

8. A ship-steering assembly comprising, in combination, a rudder, a hydraulic rudder motor connected with the rudder and in main hydraulic system with a main energizing pump, an auxiliary pump in auxiliary system with said rudder motor, a fluid-actuated shift-over valve common to said main and auxiliary systems for selectively rendering either one of the systems operative to the exclusion of the other, a fluid expansion tank, and shuttle valves connected to opposite sides of said auxiliary pump, one for admitting fluid from said expansion tank to the inlet side of said auxiliary pump, and another for admitting actuating fluid to said shift-over valve to achieve auxiliary system operation.

9. A ship-steering assembly comprising, in combination, a rudder, a hydraulic rudder motor connected with the rudder and in main hydraulic system with a main energizing pump, an auxiliary pump in auxiliary system with said rudder motor, means connected thereto for blocking reverse stresses on said pump, a shift-over valve common to said main and auxiliary systems and operable automatically under hydraulic pressure to connect said auxiliary pump with said rudder motor to the exclusion of the main pump, and pressure fluid connections hydraulically between said auxiliary pump and shift-over valve and including a pressure-operated shuttle valve for distributing fluid to actuate the shift-over valve at the initiation of auxiliary pumping regardless of direction of the pumping.

10. A ship-steering assembly comprising, in combination, a rudder, coupled piston-cylinder hydraulic steering motors connected with said rudder and connected together in parallel arrangement and in system with a main pump, an auxiliary pump and driving motor therefor encased in a water-tight submersible housing remote from said main pump and in series system with the steering motors, and a shift-over valve common to said main and auxiliary systems and remote from the main pump for selectively rendering either one of the systems operative to the exclusion of the other and changing the connection between motors from a parallel arrangement in the one case to a series arrangement in the other.

11. A ship-steering assembly, comprising in combination, mechanically coupled piston-cylinder hydraulic rudder-driving rams and a main pump for supplying fluid to the same in hydraulic system, and an auxiliary pump hydraulically connected with said mechanically coupled rams in series arrangement and excluded by the ram pistons against directly pumping fluid beyond the hydraulically adjacent face of each of the same.

ALBERT RIVINGTON STONE.
ALBERT GIRVIN WINCHESTER.

REFERENCES CITED

The following references are of record in the file of this patent:

UNITED STATES PATENTS

| Number | Name | Date |
|---|---|---|
| 1,056,194 | Martineau | Mar. 18, 1913 |
| 1,307,839 | Williams | June 24, 1919 |
| 1,725,489 | Stratton | Aug. 20, 1929 |
| 1,955,922 | Lamond | Apr. 24, 1934 |
| 2,288,076 | Erling | June 30, 1942 |
| 2,387,307 | Stone | Oct. 23, 1945 |

FOREIGN PATENTS

| Number | Country | Date |
|---|---|---|
| 262,245 | Great Britain | Dec. 9, 1926 |
| 360,458 | Great Britain | Nov. 2, 1931 |